US012707256B2

(12) United States Patent
Bae

(10) Patent No.: US 12,707,256 B2
(45) **Date of Patent: *Aug. 11, 2026**

(54) UE CAPABILITY SIGNALING DESIGN FOR ONE OR MORE FUNCTIONALITIES WITH DIFFERENT APPLICATION RESTRICTIONS IN DIFFERENT RELEASES OF A CELLULAR COMMUNICATION SPECIFICATION

(71) Applicant: Samsung Electronics Co., Ltd., Gyeonggi-do (KR)

(72) Inventor: Jung Hyun Bae, San Diego, CA (US)

(73) Assignee: Samsung Electronics Co., Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/748,541

(22) Filed: Jun. 20, 2024

(65) Prior Publication Data

US 2024/0357344 A1 Oct. 24, 2024

Related U.S. Application Data

(63) Continuation of application No. 17/356,138, filed on Jun. 23, 2021, now Pat. No. 12,022,569.

(Continued)

(51) Int. Cl.
*H04W 8/24* (2009.01)

(52) U.S. Cl.
CPC .................................... *H04W 8/24* (2013.01)

(58) Field of Classification Search
CPC ...... H04W 8/24; H04L 5/0053; H04L 5/0092; H04L 5/0094
See application file for complete search history.

(56) References Cited

U.S. PATENT DOCUMENTS

| | | | |
|---|---|---|---|
| 9,237,440 | B2 | 1/2016 | Geirhofer et al. |
| 9,894,547 | B2 | 2/2018 | Das et al. |

(Continued)

FOREIGN PATENT DOCUMENTS

| | | |
|---|---|---|
| CN | 104812073 | 7/2015 |
| CN | 107040355 | 8/2017 |

(Continued)

OTHER PUBLICATIONS

ZTE Corporation, "Discussion on UE Feature for MR-DC CA", R1-2003335, 3GPP TSG RAN WG1 Meeting #101-e, May 25-Jun. 5, 2020, 11 pages.

(Continued)

*Primary Examiner* — Congvan Tran
(74) *Attorney, Agent, or Firm* — The Farrell Law Firm, P.C.

(57) ABSTRACT

Disclosed is a method of reporting capability signaling of a user equipment (UE) in consideration of a first telecommunications standard release and a second telecommunications standard release. The method includes determining that the capability signaling of the UE may be reported according to the first telecommunications standard release and the second telecommunication standard release; and reporting the capability signaling of the UE according to the second telecommunication standard release instead of the first telecommunication standard release, wherein a level of controllability of the UE in the second telecommunication standard release is greater than or equal to a level of controllability of the UE in the first telecommunication standard release.

18 Claims, 26 Drawing Sheets

801 — Determine that UE is capable of reporting its capability signaling according to release N and release N+m 803 — Control UE to report capability signaling of the UE according to release N+m instead of release N

END

Related U.S. Application Data

(60) Provisional application No. 63/133,581, filed on Jan. 4, 2021, provisional application No. 63/071,637, filed on Aug. 28, 2020, provisional application No. 63/068,709, filed on Aug. 21, 2020.

(56) References Cited

U.S. PATENT DOCUMENTS

| | | | | |
|---|---|---|---|---|
| 9,900,232 | B2 | 2/2018 | Kanamarlapudi et al. | |
| 11,212,667 | B2 | 12/2021 | Kim et al. | |
| 11,445,443 | B2 | 9/2022 | Wu et al. | |
| 2014/0092824 | A1 | 4/2014 | He | |
| 2014/0187224 | A1 | 7/2014 | Liu et al. | |
| 2014/0376400 | A1 | 12/2014 | Kanamarlapudi et al. | |
| 2016/0119778 | A1 | 4/2016 | Uchino | |
| 2016/0338091 | A1 | 11/2016 | Martin | |
| 2018/0199185 | A1 | 7/2018 | Tenny et al. | |
| 2018/0262905 | A1 | 9/2018 | Dhanapal et al. | |
| 2020/0077454 | A1 | 3/2020 | Schliwa-Bertling | |
| 2020/0100236 | A1 | 3/2020 | Tenny | |
| 2020/0314917 | A1* | 10/2020 | Jeon | H04W 74/08 |
| 2020/0382354 | A1* | 12/2020 | Sengupta | H04L 5/001 |
| 2021/0014931 | A1* | 1/2021 | Noh | H04L 5/0035 |
| 2021/0058113 | A1 | 2/2021 | Jung | |
| 2021/0100023 | A1 | 4/2021 | Wei | |
| 2021/0250753 | A1* | 8/2021 | Hosseini | H04L 5/001 |
| 2021/0360593 | A1* | 11/2021 | Hosseini | H04L 5/0094 |
| 2021/0377941 | A1 | 12/2021 | Balakrishnan | |
| 2023/0156502 | A1* | 5/2023 | Sun | H04W 24/10 370/252 |
| 2023/0188283 | A1* | 6/2023 | Liu | H04W 72/0453 370/329 |
| 2023/0292399 | A1* | 9/2023 | Velev | H04W 76/36 |

FOREIGN PATENT DOCUMENTS

| | | |
|---|---|---|
| CN | 110431864 | 11/2019 |
| CN | 110798294 | 2/2020 |
| CN | 110958672 | 4/2020 |
| WO | WO 2015/142278 | 9/2015 |

OTHER PUBLICATIONS

Taiwanese Office Action dated Aug. 13, 2024 issued in counterpart application No. 110129933, 7 pages.

NTT Docomo, Inc., "Summary on UE Features for TEIs", R1-2002456, 3GPP TSG RAN WG1 #100bis-e, Apr. 20-30, 2020, 22 pages.

Moderator (NTT Docomo, Inc.), "Summary on Email Discussion [100b-e-NR-UEFeatures-Remaining] NR TEI", R1-2003204, 3GPP TSG RAN WG1 #100bis-e, Apr. 20-30, 2020, 11 pages.

Chinese Office Action dated Jul. 29, 2025 issued in counterpart application No. 202110901505.5, 9 pages.

Chinese Office Action dated Mar. 4, 2026 issued in counterpart application No. 202110901505.5, 4 pages.

* cited by examiner

| Index | Feature Group | Components |
|---|---|---|
| 6-7 | Two NR PUCCH group with same numerology | 1) For NR CA UE, same numerology across NR carriers for data/control channel at a given time<br>2) For EN-DC UE, same numerology across NR carriers for data/control channel at a given time, wherein an NR PUCCH group is configured in FR1 and another NR PUCCH group is configured in FR2 |
| 6-8 | Different numerology across NR PUCCH groups | For both NR CA UE and EN-DC UE, different numerology between two NR PUCCH groups for data/control channel at a given time |

From FIG. 1A (A)

| Prerequisite Feature Groups | Field name in TS 38.331 [2] | Parent IE in TS 38.331 [2] | Need of FDD/TDD differentiation | Need of FR1/FR2 differentiation | Note | Mandatory /Optional |
|---|---|---|---|---|---|---|
| 6-5, 6-6 | Two PUCCH -Group | Feature Set Uplink | N/A | N/A | | Optional with capability signaling |
| 6-5, 6-7 | diffNumerology Across PUCCH -Group | CA-Parameters NR | N/A | N/A | | Optional with capability signaling |

FIG. 1A (B)

| Index | Feature Group | Components |
| --- | --- | --- |
| 6-9 | Different numerologies across NR carriers within the same NR PUCCH group, with PUCCH on a carrier of smaller SCS | 1) For both NR CA UE, EN-DC/NE-DC UE and NR-DC UEs, same numerology between DL and UL per carrier for data/control channel at a given time<br>2) For both NR CA UE and EN-DC/NE-DC UE with one NR PUCCH group, different numerologies across NR carriers within the same NR PUCCH groups up to two different numerologies within the same NR PUCCH group wherein NR PUCCH is sent on the carrier with smaller SCS for data/control channel at a given time<br>3-1) For NR CA UE with two NR PUCCH groups, different numerologies across NR carriers up to two different numerologies within the same NR PUCCH group wherein the same NR PUCCH is sent on the carrier with smaller SCS for data/control channel at a given time.<br>3-2) For EN-DC/NE-DC UE with two NR PUCCH groups, different numerologies across NR carriers up to two different numerologies within an NR PUCCH group in FR1 wherein NR PUCCH is sent on the carrier with smaller SCS, and same numerology across NR carriers within another NR PUCCH group in FR2 for data/control channel at a given time<br>4) For NR DC UE, different numerologies across NR carriers within the same NR PUCCH group in MCG (in FR1) and up to two different numerologies within the same NR PUCCH group wherein NR PUCCH is sent on the carrier with smaller SCS for data/control channel at a given time; and same numerology across NR carriers in SCG (in FR2). |

From FIG. 1B (A)

| Prerequisite Feature Groups | Field name in TS 38.331 [2] | Parent IE in TS 38.331 [2] | Need of FDD/TDD differentiation | Need of FR1/FR2 differentiation | Note | Mandatory /Optional |
|---|---|---|---|---|---|---|
| 6-5 | diffNumerology Within PUCCH-Group Smaller SCS | CA-Parameters NR | N/A | N/A | The terminologies 'UL' and 'carrier' in this FG do not refer to 'SUL'. NR PUCCH is sent on a carrier with SCS not larger than SCS of any DL carriers corresponding to the NR PUCCH group. The case with PUCCH on UL carrier with different numerologies within SCG is not supported for NR-DC. | Optional with capability signaling |

| Index | Feature Group | Components |
|---|---|---|
| 6-9a | Different numerologies across NR carriers within the same NR PUCCH group, with PUCCH on a carrier of larger SCS | 1) For both NR CA UE, EN-DC/NE-DC UE and NR-DC UEs, same numerology between DL and UL per carrier for data/control channel at a given time<br>2) For both NR CA UE and EN-DC/NE-DC UE with one NR PUCCH group, different numerologies across NR carriers within the same NR PUCCH groups up to two different numerologies within the same NR PUCCH group wherein NR PUCCH is sent on the carrier with larger SCS for data/control channel at a given time<br>3-1) For NR CA UE with two NR PUCCH groups, different numerologies across NR carriers up to two different numerologies within the same NR PUCCH group wherein the same NR PUCCH is sent on the carrier with larger SCS for data/control channel at a given time.<br>3-2) For EN-DC/NE-DC UE with two NR PUCCH groups, different numerologies across NR carriers up to two different numerologies within an NR PUCCH group in FR1 wherein NR PUCCH is sent on the carrier with larger SCS, and same numerology across NR carriers within another NR PUCCH group in FR2 for data/control channel at a given time<br>4) For NR DC UE, different numerologies across NR carriers within the same NR PUCCH group in MCG (in FR1) and up to two different numerologies within the same NR PUCCH group wherein NR PUCCH is sent on the carrier with larger SCS for data/control channel at a given time; and same numerology across NR carriers in SCG (in FR2). |

From FIG. 1C (A)

| Prerequisite Feature Groups | Field name in TS 38.331 [2] | Parent IE in TS 38.331 [2] | Need of FDD/TDD differentiation | Need of FR1/FR2 differentiation | Note | Mandatory /Optional |
|---|---|---|---|---|---|---|
| 6-5 | diffNumerology Within PUCCH-Group Larger SCS | CA-Parameters NR-v1560 | N/A | N/A | The terminologies 'UL' and 'carrier' in this FG do not refer to 'SUL'. NR PUCCH is sent on a carrier with SCS not smaller than SCS of any DL carriers corresponding to the NR PUCCH group. The case with PUCCH on UL carrier with different numerologies within SCG is not supported for NR-DC. | Optional with capability signaling |

| Index | Feature Group | Components | Prerequisite Feature Groups | Need for the gNB to know if the feature is supported | Applicable to the capability signalling exchange between UEs (V2X WI only) |
|---|---|---|---|---|---|
| 22-7 | Support two PUCCH groups for NR-CA with 3 or more bands with at least two carrier types from carrier types {FR1 licensed TDD, FR1 unlicensed FDD, FR2} | For the BC, the UE reports one or multiple of supported configuration(s) of {primary PUCCH group config, secondary PUCCH group config} where for each supported configuration,<br>➢ the "primary PUCCH group config" includes following information:<br>✧ One or multiple from {FR1 licensed TDD, FR1 unlicensed TDD, FR1 licensed FDD, FR2} mapped to the primary PUCCH group<br>✧ One or multiple from {FR1 licensed TDD, FR1 unlicensed TDD, FR1 licensed FDD, FR2} that can be configured with the PUCCH transmission in the primary PUCCH group<br>➢ the "secondary PUCCH group config" includes following information:<br>✧ One or multiple from {FR1 licensed TDD, FR1 unlicensed TDD, FR1 licensed FDD, FR2} mapped to the secondary PUCCH group<br>✧ One or multiple from {FR1 licensed TDD, FR1 unlicensed TDD, FR1 licensed FDD, FR2} that can be configured with the PUCCH transmission in the secondary PUCCH group<br>➢ Note: For each {primary PUCCH group config, secondary PUCC group config}, each carrier type of {FR1 licensed TDD,FR1 unlicensed TDD, FR1 licensed FDD, FR2} is mapped to either or both of the primary PUCCH group config and the secondary PUCCH group config. | | Yes | N/ |

From FIG. 2 (A)

| Consequence if the feature is not supported by the UE | Type (based on the granularity of 1) Per UE, 2) Per Band, 3) Per BC, 4) Per FS or 5) Per FSPC) | Need of FDD /TDD differentiation | Need of FR1/ FR2 differentiation | Capability interpretation for mixture of FDD/TDD and/or FR1/FR2 | Note | Mandatory /Optional |
|---|---|---|---|---|---|---|
| | Per BC | N/A | N/A | N/A | Note: RAN1 will discuss on how to handle the SDL or SUL band, for example as below<br>• SDL overlapping with either TDD or FDD can follow the same principle with TDD or FDD accordingly<br>• SDL having no overlapped TDD or FDD can follow the same principle with FDD<br>Note: When the carrier type of NUL is indicated for PUCCH transmission location, the SUL in the same cell as in the NUL can also be configured for PUCCH transmission<br>• FFS: how to cover licensed/unlicensed and/or FR1/FR2 differntiations<br>Note: When the carrier type of NUL is indicated for one PUCCH group config, the SUL in the same cell as in the NUL can also be configured for the PUCCH group<br>• FFS: SUL is counted as number of bands for the condition of this new FG reporting | Optional with capability signaling |

FIG. 2 (B)

| Index | Feature Group | Components | Prerequisite Feature Groups | Need for the gNB to know if the feature is supported | Applicable to the capability signalling exchange between UEs (V2X WI only) |
|---|---|---|---|---|---|
| 22-x | Different numerologies across NR carriers within the same NR PUCCH group, with PUCCH on a carrier of smaller SCS | 1) For NR CA UE, same numerology between DL and UL per carrier for data/control channel at a given time<br>2) For NR CA UE with two NR PUCCH groups, different numerologies across NR carriers up to two different numerologies within the same NR PUCCH group wherein NR PUCCH is sent on the carrier with smaller SCS for data/control channel at a given time | 22-7 | Yes | N/A |

From FIG. 3A (A)

| Consequence if the feature is not supported by the UE | Type (based on the granularity of 1) Per UE, 2) Per Band, 3) Per BC, 4) Per FS or 5) Per FSPC) | Need of FDD /TDD differen-tiation | Need of FR1/ FR2 differen-tiation | Capability interpretation for mixture of FDD/TDD and/or FR1/FR2 | Note | Mand-atory /Optional |
|---|---|---|---|---|---|---|
| | Per BC | N/A | N/A | N/A | | Optional with capability signaling |

FIG. 3A (B)

| Index | Feature Group | Components | Prerequisite Feature Groups | Need for the gNB to know if the feature is supported | Applicable to the capability signalling exchange between UEs (V2X WI only) |
|---|---|---|---|---|---|
| 22-y | Different numerologies across NR carriers within the same NR PUCCH group, with PUCCH on a carrier of larger SCS | 1) For NR CA UE, same numerology between DL and UL per carrier for data/control channel at a given time<br>2) For NR CA UE with two NR PUCCH groups, different numerologies across NR carriers up to two different numerologies within the same NR PUCCH group wherein NR PUCCH is sent on the carrier with larger SCS for data/control channel at a given time | 22-7 | Yes | N/A |

From FIG. 3B (A)

| Consequence if the feature is not supported by the UE | Type (based on the granularity of 1) Per UE, 2) Per Band, 3) Per BC, 4) Per FS or 5) Per FSPC) | Need of FDD /TDD differen-tiation | Need of FR1/ FR2 differen-tiation | Capability interpretation for mixture of FDD/TDD and/or FR1/FR2 | Note | Mand-atory /Optional |
|---|---|---|---|---|---|---|
| | Per BC | N/A | N/A | N/A | | Optional with capability signaling |

FIG. 3B (B)

| Features | Index | Feature Group | Components |
| --- | --- | --- | --- |
| 3. DL control channel and procedure | 3-1 | Basic DL control channel | 1) One configured CORESET per BWP per cell in addition to CORESET0<br>- CORESET resource allocation of 6RB bit-map and duration of 1-3 OFDM symbols for FR1<br>- For type 1 CSS without dedicated RRC configuration and for type 0, 0A, and 2 CSSs, CORESET resource allocation of 6RB bit-map and duration 1-3 OFDM symbols for FR2<br>- For type 1 CSS with dedicated RRC configuration and for type 3 CSS, UE specific SS, CORESET resource allocation of 6 RB bit-map and duration 1-2 OFDM symbols for FR2<br>- REG-bundle sizes of 2/3 RBs or 6 RBs<br>- Interleaved and non-interleaved CCE-to-REG mapping<br>- Precoder-granularity of REG-bundle size<br>- PDCCH DMRS scrambling determination<br>- TCI state(s) for CORESET configuration<br>2) CSS and UE-SS configurations for unicast PDCCH transmission per BWP per cell<br>- PDCCH aggregation levels 1,2,3,4,8,16<br>- UP to 3 search space sets in a slot for a scheduled SCell per BWP<br>This search space limit is before applying all dropping rules.<br>- For type 1 CSS with dedicated RRC configuration, type 3 CSS, and UE-SS, the monitoring occasion is within the first 3 OFDM symbols of a slot<br>- For type 1 CSS without dedicated RRC configuration and for type 0, 0A, and 2 CSS, the monitoring occasion can be any OFDM symbols(s) of a slot, with the monitoring occasions for any of Type 1-CSS without dedicated RRC configuration, or Types 0, 0A, or 2 CSS configurations within a single span of three consecutive OFDM symbols within a slot<br>3) Monitoring DCI formets 0_0, 1_0, 0_1, 1_1<br>4) Number of PDCCH blind decodes per slot with a given SCS follows Case 1-1 table<br>5) Processing one unicast DCI scheduling DL and one unicast DCI scheduling UL per slot per scheduled CC for FDD<br>6) Processing one unicast DCI scheduling DL and 2 unicast DCI scheduling UL per slot per scheduled CC for TDD |

| Index | Feature Group | Components | Prerequisite feature groups | Field name in TS 38.331 [2] | Mandatory /Optional |
|---|---|---|---|---|---|
| 3-2 | PDCCH monitoring on any span of up to 3 consecu-tive OFDM symbols of a slot | For a given UE, all search space configurations are within the same span of 3 consecutive OFDM symbols in the slot | PDCCH monitoring single occasion | Phy-Parameters FR1 | Optional with capability signaling |

| Index | Feature Group | Components | Prerequisite feature groups | Field name in TS 38.331 [2] | Mandatory /Optional |
|---|---|---|---|---|---|
| 3-5 | For type 1 CSS with dedicated RRC configurat-ion, type 3 CSS, monitoring occasion can be any OFDM symbol(s) of a slot for Case 2 | For type 1 CSS with dedicated RRC configuration, type 3 CSS, and UE-SS, monitoring occasion can be any OFDM symbol(s) of a slot for Case 2 | PDCCH monitoring Any occasion {3-5 without DCI- Gap 3-5a. with DCI-Gap} | Feature Set Down link | Optional with capability signaling |

| Index | Feature Group | Components | Prerequisite feature groups | Field name in TS 38.331 [2] | Mandatory /Optional |
|---|---|---|---|---|---|
| 3-5a | For type 1 CSS with dedicated RRC configura-tion, type 3 CSS, and UE-SS monitoring occasion can be any OFDM symbols(s) of slot for case 2 with a DCI gap | For type 1 CSS with dedicated RRC configuration, type 3 CSS and UE-SS, monitoring occasion can be any OFDM symbols(s) of a slot for Case 2, with minimum time separation (including the cross-slot boundary case) between two DL unicast DCIs, between two UL unicast DCIs, or between a DL and an UL unicast DCI in different monitoring occasions where at least one of them is not the monitoring occasions of FG-3-1, for a same UE as<br>- 2OFDM symbols for 15kHz<br>- 4OFDM symbols for 30kHz<br>- 7OFDM symbols for 60kHz with NCP<br>- 11OFDM symbols for 120kHz<br>Up to one unicast DL DCI and up to one unicast UL DCI in a monitoring occasion except for the monitoring occasions of FG 3-1. In addition for TDD the minimum separation between the first two UL unicast DCIs within the first 3 OFDM symbols of a slot can be zero OFDM symbols. | | | Optional with capability signaling |

| Index | Feature Group | Components |
|---|---|---|
| 3-5b | All PDCCH monitoring occasion can be any OFDM symbols(s) of a slot for case 2 with a span gap | PDCCH monitoring occasions of FG-3-1, plus additional PDCCH monitoring occasion(s) can be any OFDM symbol(s) of a slot for Case 2, and for any two PDCCH monitoring occasions belonging to different spans, where at least one of them is not the monitoring occasions of FG-3-1, in same or different search spaces, there is a minimum time separation of X OFDM symbols (including the cross-slot boundary case) between the start of two spans, where each span is of length up to Y consecutive OFDM symbols of a slot. Spans do not overlap. Every span is contained in a single slot. The same span pattern repeats in every slot. The separation between consecutive spans within and across slots may be unequal but the same (X,Y) limit must be satisfied by all spans. Every monitoring occasion is fully contained in one span. In order to determine a suitable span pattern, first a bitmap b(1), 0<=1<=13 is generated, where b(1)=1 if symbol 1 of any slot is part of a monitoring occasion, b(1)=0 otherwise. The first span in the span pattern begins at the smallest 1 for which b(1)=1. The next span in the span pattern begins at the smallest 1 not included in the previous span(s) for which b(1)=1. The span duration is max {maximum value of all CORESET durations, minimum value of Y in the UE reported candidate value} except possibly the last span in a slot which can be of shorter duration. A particular PDCCH monitoring configuration meets the UE capability limitation if the span arrangement satisfies the gap separation for at least one (X,Y) in the UE reported candidate value set in every slot, including cross slot boundary.<br>• Processing one unicast DCI scheduling DL and one unicast DCI scheduling UL per scheduled CC across this set of monitoring occasions for FDD<br>• Processing one unicast DCI scheduling DL and two unicast DCI scheduling UL per scheduled CC across this set of monitoring occasions for TDD<br>• Processing two unicast DCI scheduling DL and one unicast DCI scheduling UL per scheduled CC across this set of monitoring occasions for TDD<br>The number of different start symbol indices of spans for all PDCCH monitoring occasions per slot, including PDCCH monitoring occasions of FG-3-1, is no more than floor (14/X)(X is minimum among values reported by UE).<br>The number of different start symbol indices of PDCCH monitoring occasions per slot including PDCCH monitoring occasions of FG-3-1, is no more than 7.<br>The number of different start symbol indices of PDCCH monitoring occasions per half-slot including PDCCH monitoring occasions of FG-3-1 is no more than 4 in SCell. |

| Features | Index | Feature Group | Components |
|---|---|---|---|
| 5. Scheduling /HARQ operation | 5-1 | Basic schedu-ling/ HARQ operation | 1) Frequency-domain resource allocation<br>- RA Type 0 only and Type 1 only for PDSCH without interleaving<br>- RA Type 1 for PUSCH without interleaving<br>2) Time-domain resource allocation<br>- 1-14 OFDM symbols for PUSCH once per slot<br>- One unicast PDSCH per slot<br>- Starting symbol, and duration are determined by using the DCI<br>- PDSCH mapping type A with 7-14 OFDM symbols<br>- PUSCH mapping type A and Type B<br>- For type 1 CSS without dedicated RRC configuration and for type 0, 0A, and 2 CSS, PDSCH mapping type A with {4-14} OFDM symbols and type B with {2,4,7} OFDM symbols<br>3) TBS determination<br>4) Nominal UE processing time for N1 and N2 (Capability # 1)<br>5) HARQ process operation with configurable number of DL HARQ processes of up to 16<br>6) Cell specific RRC configured UL/DL assignment for TDD<br><br>7) **Dynamic UL/DL determination based on L1 scheduling DCI with/without cell specific RRC configured UL/DL assignment**<br><br>8) Intra-slot frequency-hopping for PUSCH scheduled by Type 1 CSS before RRC connection<br>9) In TDD support at most one switch point per slot for actual DL/UL transmission(s)<br>10) DL scheduling slot offset K0=0<br>11) DL scheduling slot offset K0=1 for type 1 CSS without dedicated RRC configuration and for type 0, 0A, and 2 CSS<br>12) UL scheduling slot offset K2<=12<br><br>For type 1 CSS without dedicated RRC configuration and for type 0, 0A, and 2 CSS, interleaving for VRB-to-PRB mapping for PDSCH |

FIG. 5A

| Index | Feature Group | Components |
| --- | --- | --- |
| 5-1a | UE specific RRC configure UL/DL assignment | Dynamic UL/DL determination based on L1 scheduling DCI with cell - specific and UE specific RRC configured UL/DL assignment |

From FIG. 5B (A)

| Field name in TS 38.331 [2] | Parent IE in TS 38.331 [2] | Need of FDD/TDD differentiation | Need of FR1/FR2 differentiation | Note | Mandatory /Optional |
|---|---|---|---|---|---|
| UE- specific UL-DL assignment | Feature Set Down link | N/A | N/A | | Optional with capability signaling |

FIG. 5B (B)

| Features | Index | Feature Group | Components | Prerequisite Feature Groups | Need for the gNB to know if the feature is supported |
| --- | --- | --- | --- | --- | --- |
| 11. NR_L1 enh_URLLC | 11-7 | UL cancelation scheme for self-carrier | 1. Supports group common DCI (i.e. DCI format 2_4) for cancelation indication on the same DL CC as that scheduling PUSCH or SRS<br>2. UL cancelation for PUSCH<br>• Cancelation is applied to each PUSCH repetition individually in case of PUSCH repetitions<br>3. UL cancelation for SRS symbols that overlap with the cancelled symbols | | Yes |

From FIG. 6A (A)

| Applicable to the capability signalling exchange between UEs (V2X WI only) | Type ( 1) Per UE or 2) Per Band or 3) Per BC or 4) Per FS or 5) Per FSPC) | Need of FDD /TDD differen-tiation | Need of FR1/ FR2 differen-tiation | Capability interpretation for mixture of FDD/TDD and/or FR1/FR2 | Note | Mand-atory /Optional |
|---|---|---|---|---|---|---|
| N/A | Per FS<br><br>Per FS is selected because the FG is very demanding in UE processing considering that this can be a UE with processing capability 1 but required to be able to cancel according to processing capability 2, and hence it is important to take into account the BC information for dimensioning purpose | N/A | N/A | N/A | More than one monitoring occasion for DCI format 2_4 per slot is applied only if the UE reports to support FG 3-5 or FG 3-5a or FG 3-5b or 11-2 or 11-2a | Optional with capability signaling |

| Features | Index | Feature Group | Components | Prerequisite Feature Groups | Need for the gNB to know if the feature is supported |
|---|---|---|---|---|---|
| 11. NR_L1 enh_URLLC | 11-7a | UL cancelation scheme for cross-carrier | 1. Supports group common DCI (i.e. DCI format 2_4) for cancelation indication on a different DL CC than that scheduling PUSCH or SRS<br>2. UL cancelation for PUSCH<br>• Cancellation is applied to each PUSCH repetition individually in case of PUSCH repetitions<br>3. UL cancelation for SRS symbols that overlap with the cancelled symbols | | Yes |

From FIG. 6B (A)

| Applicable to the capability signalling exchange between UEs (V2X WI only) | Type ( 1) Per UE or 2) Per Band or 3) Per BC or 4) Per FS or 5) Per FSPC) | Need of FDD /TDD differen-tiation | Need of FR1/ FR2 differen-tiation | Capability interpretation for mixture of FDD/TDD and/or FR1/FR2 | Note | Mand-atory /Optional |
|---|---|---|---|---|---|---|
| N/A | Per FS<br><br>Per FS is selected because the FG is very demanding in UE processing considering that this can be a UE with processing capability 1 but required to be able to cancel according to processing capability 2, and hence it is important to take into account the BC information for dimensioning purpose | N/A | N/A | N/A | More than one monitoring occasion for DCI format 2_4 per slot is applied only if the UE reports to support FG 3-5 or FG 3-5a or FG 3-5b or 11-2 or 11-2a | Optional with capability signaling |

FIG. 6B (B)

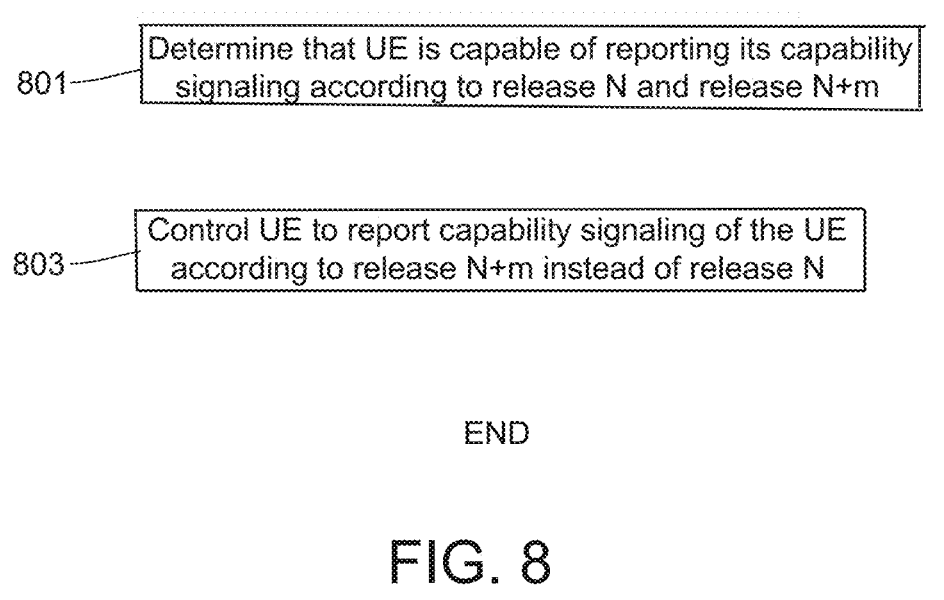

801 Determine that UE is capable of reporting its capability signaling according to release N and release N+m 803 Control UE to report capability signaling of the UE according to release N+m instead of release N

END

FIG. 8

UE CAPABILITY SIGNALING DESIGN FOR ONE OR MORE FUNCTIONALITIES WITH DIFFERENT APPLICATION RESTRICTIONS IN DIFFERENT RELEASES OF A CELLULAR COMMUNICATION SPECIFICATION

PRIORITY

This application is a Continuation Application of U.S. patent application Ser. No. 17/356,138, filed in the U.S. Patent and Trademark Office on Jun. 23, 2021, which is based on and claims priority under 35 U.S.C. § 119(e) to U.S. Provisional Application Ser. Nos. 63/068,709, 63/071,637, and 63/133,581, filed in the U.S. Patent and Trademark Office on Aug. 21, 2020, Aug. 28, 2020, and Jan. 4, 2021, respectively, the contents of each of which are incorporated herein by reference.

BACKGROUND

1. Field

The disclosure relates generally to a user equipment (UE), and more particularly, to UE capability signaling in various releases of the cellular communication specification.

2. Description of Related Art

UE capability signaling refers to the mechanism with which the UE informs a g node B (gNB) of its capability to perform certain features. As examples of reporting UE capability, particularly in the third generation partnership project (3GPP) telecommunications standard, the following bases reflect an increase in the UE's level of control in reporting support from the first to the last basis.

The UE can report its capability to perform certain features in any scenario or in all cases, such that the UE has the least amount of granularity or control in reporting its capability. This reporting affords the UE a low level of control and is referred to as on a per-UE basis.

The UE can report its capability to perform certain features in particular bands regardless of other band combinations including the particular bands. This reporting affords the UE an increased level of control and more granularity than in the per-UE basis and is referred to as reporting on a per-band basis.

The UE can report its capability to perform certain features in particular band combinations used to indicate the UE's carrier aggregation (CA). In this case, the UE may support this operation in any band included in the band combination but does not have selective control over which band in the band combination to use for supporting the operation. This reporting affords the UE and an increased level of control and more granularity than in the per-band basis and is referred to as reporting on a per-bandcombination or per-BC basis.

The UE can report its capability to perform certain features in specific band(s) in a particular band combination for CA, unlike in the per-BC basis. In this case, a mechanism referred to as feature sets can be used to allow the UE to selectively signal support of such features differently in each band in the band combination. This affords the UE and an increased level of control and more granularity than in the per-BC basis and is referred to as reporting on a per-featureSet or per-FS basis.

The UE can report its capability to perform certain features in specific component carrier(s) (CC) in a particular band combination for CA. In this case, a mechanism referred to as feature sets per cc can be used to allow the UE to selectively signal support of such features not only differently in each band in the band combination, as in the per-FS basis, but also a different level of support within the component carrier in each band. This reporting affords the UE maximum granularity as to flexibility, is a highest level of controllability for the UE out of the foregoing levels of control and is referred to as reporting on a per-featureSet per cc or per-FSPC basis.

As seen above, a UE's flexibility for declaring support of certain features increases from the per-UE basis to the per-FSPC basis. For example, if feature A and feature B are per-FSPC, the UE can have full flexibility of supporting only one of feature A and B in each CC. However, if those features are per-UE, then a UE would always need to support or not support, and some UE under-reporting could ensue. That is, in the per-UE basis, the UE is unable to declare support if the UE is unable to verify such support in all scenarios. The trade-off to added flexibility is the increased overhead incurred by the UE in signaling. Hence, determination of how a certain feature is declared must acknowledge complexity of the feature in UE implementation and associated signaling overhead.

In 3GPP, the aforementioned capability signaling typically depends on each specification release. In many cases, capability signaling designed for a certain functionality in one release subsequently creates a challenging situation to a UE in that the UE may not be able to provide a blanket-type capability indication, such as in the above-described per-UE basis. A more precise declaration of a feature support tends to be introduced in the later releases, which prevents under-reporting but also increases signaling overhead for the UE. Similarly, a mandatory functionality for a UE to support subsequently creates a challenging situation to a UE when simultaneous operation with another functionality is considered. In this case, new capability signaling to indicate support of such simultaneous operation can be introduced in later releases.

The prior art is deficient as to the manners in which the existing Release 15 (Rel-15) signaling and Release 16 (Rel-16) signaling interact. In one mechanism, Rel-15 signaling still governs support of 2 physical uplink control channel (PUCCH) groups, while Rel-16 signaling additionally provides suitable restrictions a UE prefers. While this mechanism would work well if a gNB receiving this capability indication is Rel-16 capable, for a gNB that is only Rel-15 capable, the Rel-16 capability aspect is not acknowledged. Thus, this gNB will assume that a UE is capable of 2 PUCCH groups with arbitrary grouping, which is inefficient if this UE has an issue with arbitrary grouping.

Accordingly, there is a need in the art for an improved UE capability method that effectively considers and adapts the method of the previous specification with the current specification for optimizing UE performance.

SUMMARY

The present disclosure has been made to address at least the above-mentioned problems and/or disadvantages and to provide at least the advantages described below.

Accordingly, an aspect of the present disclosure is to provide an improved interaction between the previous and new capability signaling on the same or similar functionality.

In accordance with an aspect of the disclosure, a method of reporting a UE's capability signaling in consideration of a first telecommunications standard release and a second telecommunications standard release. The method includes determining that the capability signaling of the UE may be reported according to the first telecommunications standard release and the second telecommunication standard release; and reporting the capability signaling of the UE according to the second telecommunication standard release instead of the first telecommunication standard release, wherein a level of controllability of the UE in the second telecommunication standard release is greater than or equal to a level of controllability of the UE in the first telecommunication standard release.

In accordance with another aspect of the disclosure, a UE includes a memory and a processor. The processor is configured to control the UE to report the UE's capability signaling in consideration of a first telecommunications standard release and a second telecommunications standard release, by determining that the capability signaling of the UE may be reported according to the first telecommunications standard release and the second telecommunications standard release; and controlling the UE to report the capability signaling of the UE according to the second telecommunications standard release instead of the first telecommunications standard release, wherein a level of controllability of the UE in the second telecommunications standard release is greater than or equal to a level of controllability of the UE in the first telecommunications standard release.

BRIEF DESCRIPTION OF THE DRAWINGS

The above and other aspects, features, and advantages of the present disclosure will be more apparent from the following detailed description taken in conjunction with the accompanying drawings, in which:

FIGS. 1A(A)-1A(B), 1B(A)-1B(B) and 1C(A)-1C(B) illustrate Rel-15 UE capability signaling to which the disclosure is applied;

FIG. 2A(A)-2A(B) illustrate rel-16 UE capability signaling to which the disclosure is applied;

FIG. 3A(A)-3A(B) illustrate a first feature group according to an embodiment;

FIG. 3B(A)-3B(B) illustrate a second feature group according to an embodiment;

FIGS. 4A, 4B, 4C, 4D, and 4E illustrate UE capabilities in the downlink (DL) control channel and procedure feature of Rel-15, to which the disclosure is applied;

FIGS. 5A and 5B(A)-5B(B) illustrate feature groups in feature 5 of Rel-15, to which the disclosure is applied;

FIGS. 6A(A)-6A(B) and 6B(A)-6B(B) illustrate Rel-16 capability for functionality of feature group 5-1a in Rel-15, to which the disclosure is applied;

FIG. 8 is a flowchart illustrating a method of controlling capability signaling of a UE in consideration of a telecommunications standard release N and a telecommunications standard release N+m where m>0, according to an embodiment.

DETAILED DESCRIPTION

Figure 7:
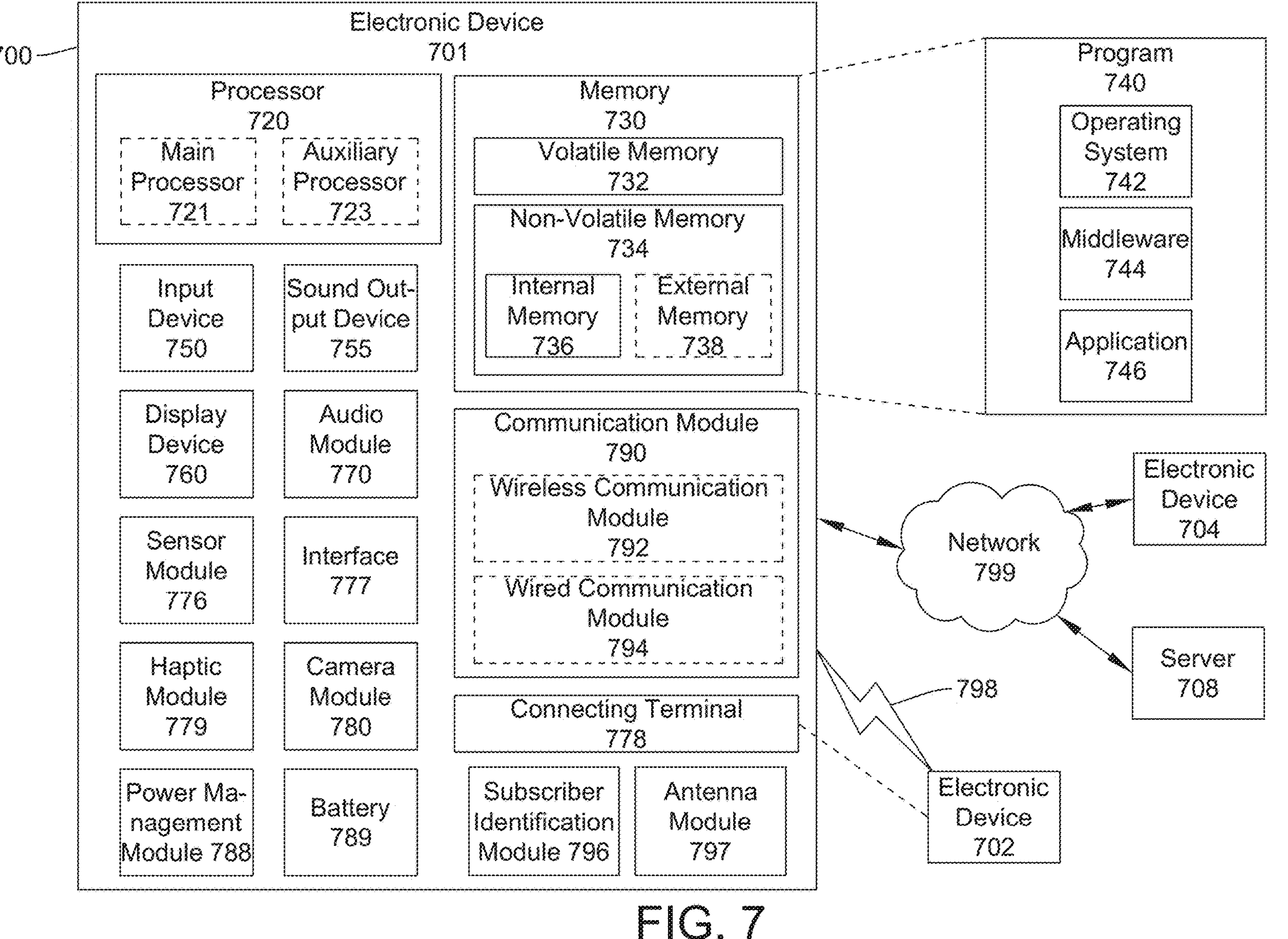
FIG. 7 is a block diagram of an electronic device in a network environment according to an embodiment.

Embodiments of the present disclosure will be described herein below with reference to the accompanying drawings. However, the embodiments of the disclosure are not limited to the specific embodiments and should be construed as including all modifications, changes, equivalent devices and methods, and/or alternative embodiments of the present disclosure. Descriptions of well-known functions and/or configurations will be omitted for the sake of clarity and conciseness.

The expressions "have," "may have," "include," and "may include" as used herein indicate the presence of corresponding features, such as numerical values, functions, operations, or parts, and do not preclude the presence of additional features. The expressions "A or B," "at least one of A or/and B," or "one or more of A or/and B" as used herein include all possible combinations of items enumerated with them. For example, "A or B," "at least one of A and B," or "at least one of A or B" indicate (1) including at least one A, (2) including at least one B, or (3) including both at least one A and at least one B.

Terms such as "first" and "second" as used herein may modify various elements regardless of an order and/or importance of the corresponding elements, and do not limit the corresponding elements. These terms may be used for the purpose of distinguishing one element from another element. For example, a first user device and a second user device may indicate different user devices regardless of the order or importance. A first element may be referred to as a second element without departing from the scope the disclosure, and similarly, a second element may be referred to as a first element.

When a first element is "operatively or communicatively coupled with/to" or "connected to" another element, such as a second element, the first element may be directly coupled with/to the second element, and there may be an intervening element, such as a third element, between the first and second elements. To the contrary, when the first element is "directly coupled with/to" or "directly connected to" the second element, there is no intervening third element between the first and second elements.

All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the disclosure.

FIGS. 1A(A)-1A(B), 1B(A)-1B(B) and 1C(A)-1C(B) illustrate UE capability signaling according to the prior art. Specifically, FIG. 1A(A)-1A(B) illustrate a portion, i.e., feature groups 6-7 (110) and 6-8 (120) of 3GPP Rel-15, FIG. 1B(A)-1B(B) illustrates feature group 6-9 (130) of Rel-15, and FIG. 1C(A)-1C(B) illustrate feature group 6-9a (140) of Rel-15.

In the current fifth generation (5G) communication, a PUCCH is transmitted in only a few cells in a CA scenario, and one cell will transmit a PUCCH corresponding to all cells in the same PUCCH group. 3GPP Rel-15 supports up to 2 PUCCH groups for CA. The corresponding UE capability signaling is described in FIGS. 1A(A)-1A(B), 1B(A)-1B(B) and 1C(A)-1C(B).

In feature group 6-7 (110) shown in the second column in FIG. 1A(A)-1A(B), the first row of the fifth column provides the signaling name (i.e., "Two NR PUCCH group with same numerology" or 2PUCCH group) indicating the support of feature group 6-7 (110). The third column provides the detailed description of the 2PUCCH group. The level or granularity of the signaling is provided in the sixth column (i.e., feature set uplink or per FS).

In feature group 6-8 (120), "Different numerology across NR PUCCH groups" is described, and in feature group 6-9 (130), "Different numerologies across NR carriers within the same NR PUCCH group, with PUCCH on a carrier of larger SCS" is described. These two feature groups as well as feature group 6-9a are grouped together herein for convenience of description since they are related.

Feature group 6-8 (120) denotes that feature group 6-7 (110) is supported but assumes different numerologies across the PUCCH group. The fifth column in feature group 6-8 indicates feature group 6-7 (110) as a prerequisite for feature group 6-8. As shown, feature groups 6-8 (120) and 6-9 (130) indicate "per BC" granularity. Feature group 6-9a (140) is also shown and is a slightly different version than feature group 6-9 as to the 2 PUCCH groups.

However, Rel-15 capability signaling as directed to in FIGS. 1A(A)-1A(B), 1B(A)-1B(B) and 1C(A)-1C(B) provides no manner by which a UE can indicate which combinations of PUCCH groupings are supported.

To resolve this issue, a grouping mechanism and declaration of supported grouping are disclosed as UE capabilities in a release N+m.

FIG. 2A(A)-2A(B) illustrate UE capability signaling to which the disclosure is applied. Specifically, FIG. 2A(A)-2A(B) illustrate a portion, i.e., feature group 22-7 (210) of 3GPP document Rel-16.

In FIG. 2A(A)-2A(B), feature group 22-7 (210) is an introduced functionality corresponding to feature group 6-7 (110) in Rel-15 with a finer level of UE control as to grouping possibilities, in that the UE can indicate the support of certain groups in more detailed fashion.

When a release N+m based UE transmits release N+m signaling together with release-N signaling, a Rel-16 based network can misinterpret the UE as supporting a Rel-15 feature without any restriction. This is a misinterpretation since primary motivations of feature group 22-7 (210) in Rel-16 were the excess breadth of feature group 6-7 (110) in Rel-15 control-wise and the difficulty in UE operation since the grouping possibilities could not be specified. The signaling in feature group 22-7 (210) improved upon this shortcoming in feature group 6-7 (110) in Rel-15. That is, with feature group 22-7 (210), a UE can indicate which of frequency range 1 (FR1) licensed time division duplex (TDD), FR1 unlicensed TDD, FR1 licensed frequency division duplex (FDD), and FR2 carrier types can be grouped together as one PUCCH group. Also, a UE can indicate which of FRI licensed TDD, FR1 unlicensed TDD, FR1 licensed FDD, and FR2 can be used as a PUCCH transmission carrier. In other words, a UE is afforded more flexibility regarding PUCCH grouping and the PUCCH carrier.

Moreover, due to this difficulty in UE operation, the UE that supports Rel-16 likely cannot also support feature group 6-7 (110) in Rel-15, In other words, the new signaling in Rel-16 would be unnecessary if the UE were able to support the signaling in feature group 6-7 (110) in Rel-15. The underlying assumption, therefore, is that the Rel-16 based UE cannot signal a Rel-15 component since there is the foregoing risk of misinterpretation by the Rel-15 based network. The Rel-15 based network would not know whether the Rel-16 based UE signaled additional restrictions using the Rel-16 based part of the signal. Thus, the Rel-15 based network could misinterpret the UE's actual capability.

As shown in FIG. 2A(A)-2A(B), feature group 22-7 (210) in Rel-16 closely relates to feature group 6-7 (110) in Rel-15 shown in FIG. 1A(A)-1A(B) but affords more control by the UE. However, the nature of the signaling between these two feature groups in different releases is identical. When the UE transmits its capability signaling, the network receives and tries to interpret the signaling. It is necessary for there to be an indication of the release by which the capability signaling is transmitted so that the network can accurately interpret the signaling and know the UE's capability. Furthermore, in Rel-15, feature group 6-7 (110) relates to PUCCH grouping while feature groups 6-8 (120), 6-9 (130) and 6-9a (140) relate to a different matter, i.e., grouping with different numerologies. Meanwhile, in Rel-16, feature group 22-7 (210) relates to grouping but the grouping condition does not describe numerology. Instead, feature group 22-7 (210) describes the nature of the carrier such that they can be grouped together.

FIG. 3A(A)-3A(B) illustrate a first feature group according to an embodiment. FIG. 3B(A)-3B(B) illustrate a second feature group according to an embodiment. Since the two feature groups describe whether a UE supports a PUCCH on a smaller and/or larger subcarrier spacing, an alternative method is for one feature group to have larger or smaller component values such that a UE can indicate one of these values.

In particular, FIG. 3A(A)-3A(B) illustrate a feature group 22-x (310) for a release N+m (Rel-16), and FIG. 3B(A)-3B(B) illustrate a feature group 22-y (320) for the release N+m.

For the same level of control on the UE side in combining release N (Rel-15) and release N+m, the UE should be able to utilize the existing signaling in release N, such as feature groups 6-8 (120), 6-9 (130) and 6-9a (140) in Rel-15 together with the signaling in release N+m. Otherwise, if the UE only utilizes release N+m, the UE will be unable to have the benefit of the same level of control that was provided in release N.

It may be considered that the UE can declare the release N+m portion of the signaling and the network will try to interpret and combine the signaling such that appropriate restrictions can be applied. However, the network origin may be release N-based or release N+m based, and similarly, the UE origin may be release N-based or release N+m based. Typically, the network does not reveal such origin since, by virtue of the UE capability indication, this may not be necessary. Also, the network typically only interprets the UE signaling that corresponds to the release of the network origin.

Yet, for example, when a release N+m based UE transmits release N+m signaling together with release-N signaling, it can be misinterpreted by a Rel-16 based network that the UE is supporting a Rel-15 feature without any restriction.

Accordingly, a UE can be regulated in a manner that the UE does not directly declare a particular functionality corresponding to capability in release N if it declares further limiting capability in release N+m. In this case, with a release N capable gNB, a UE will not be configured with the particular functionality. A capability signaling in release N+m should be self-complete to fully realize the related operation of capability in release-N as well. In other words, new capability signaling corresponding to such feature groups as 6-8 (120), 6-9 (130) and 6-9a (140) in Rel-15 should transfer to or be reflected in the corresponding release N+m portion of the signaling. For example, when feature group 6-7 (110) is reformulated with more restrictions in release N+m, the related functionality in feature groups 6-8 (120), 6-9 (130) and 6-9a (140) should also transfer to make release N+m self-complete. In this manner, capability signaling of the UE in release N is indicated to the release N-capable gNB when the capability signaling is reported in release N+m, as feature group 6-8, 6-9, 6-9a functionalities are reported using separate and dedicated release N+m capability signaling.

Furthermore, in certain capabilities that are needed to transfer from an earlier release to a new release, there should be the same indication in the new release on a similar or more flexible basis. That is, for example, in Rel-15, feature groups 6-8 (120), 6-9 (130) and 6-9a (140) are on a per-BC basis. Accordingly, FIGS. 3A(A)-3A(B) and 3B(A)-3B(B) disclose the level of the signaling as per-BC.

Furthermore, in certain capabilities that are needed to transfer from an earlier release to a new release, there should be the same indication in the new release on a similar or more flexible basis. That is, for example, in Rel-15, feature groups 6-8 (120), 6-9 (130) and 6-9a (140) are on a per-BC basis. Accordingly, FIGS. 3A and 3B disclose the level of the signaling as per-BC.

When these feature groups are transferred to the newer release (i.e., Rel-16) to make Rel-16 self-complete, then the granularity of Rel-16, shown in the eighth column in FIGS. 2A(A)-2A(B), 3A(A)-3A(B) and 3B(A)-3B(B) for example, should be at least as good as the granularity of Rel-15 vis-à-vis these feature groups. In so doing, the level of controllability, such as per-BC, remains at least the same and does not degrade in the new release to per-UE, for example. However, the level of controllability may be improved since the new release concerns further restrictions. Thus, the granularity (or level of controllability for the UE) of the related signaling in a new release may be greater than or equal to the granularity in the earlier release.

Overall, therefore, if capability in release N is a support/no support indication, then capability signaling in release N+m should also have such an indication with the same or more flexible basis (per-UE, per BC, per-FS, per-FSPC etc.) than the capability of release N.

In addition, it is assumed that a UE does not declare support of 2 PUCCH groups with Rel-15 signaling in problematic scenarios for a UE and only declares a Rel-16 portion of signaling to support 2 PUCCH groups with suitable restrictions. In this case, however, with a Rel-15 gNB, a UE will not be configured with 2 PUCCH groups.

In general, a particular functionality for which capability signaling exists in release N can be considered. In later release N+m where m>0, capability signaling on a particular functionality can be re-introduced such that a UE can further limit the supportable scenarios of a particular functionality.

In some mechanisms, such a support indication can be implicit. For example, indication of support of limited scenarios using release N+m capability can be interpreted as support of a particular functionality.

Some indication from a network can be provided to a UE such that a UE can know the network's release version. In this case, a UE may have two different behaviors in the two different releases. If the UE does not know the release in which the network should be operating when the network supports both behaviors, for example, a problem can occur in which the network could give misinformation on how the UE should behave. The UE can signal support of a particular functionality using release N signaling even if the UE only supports a limited (or modified) version of a particular functionality when the UE knows that the network release version is N+m. Such knowledge of the network release version, by the UE, also can improve system performance since the UE's behavior may differ between the two releases. In other words, system degradation may be incurred if the UE does not have a clear indication of which behavior the UE should use.

In the example of 2 PUCCH groups, a grouping mechanism in Rel-16 capability can become an implicit indication. In this case, a basis of a Rel-16 signaling would be per-FS or per-FS-BC, since Rel-15 capability feature group 6-7 (110) is per FS. Alternatively, explicit indication of support of 2 PUCCH groups can be introduced with per-FS signaling to replace capability in Rel-15 for a Rel-16 capable gNB. In this case, a Rel-16 capable gNB will only consider Rel-16 indications.

As another example for 2 PUCCH groups, the existing Rel-15 feature groups 6-9 (130) and 6-9a (140) can be re-introduced in Rel-16 in the manner of feature group 22-x (310) in FIGS. 3A(A)-3A(B) and feature group 22-y (320) in FIG. 3B(A)-3B(B), respectively, for self-completeness of Rel-16 signaling given by feature group 22-7 (210).

Another possible example for the case of 2 PUCCH groups is to include such support of different numerologies within a PUCCH group in the signaling of feature group 22-7 (210). In that case, each group in each configuration signaled in feature group 22-7 (210), such as a primary PUCCH group configuration and a secondary PUCCH group configuration, may indicate support of such different numerologies. Such indication can be smaller, larger, or both smaller and larger to cover similar cases as feature groups 6-9 (130) and 6-9a (140). Alternatively, such support of different numerologies may be indicated once per BC instead of for every configuration, which implies a UE does or does not support different numerologies within a group for all indicated configurations.

In 3GPP document R1-2007022, it is discussed that in cellular communication, an uplink signal/channel is applied a timing advance (TA) to align multiple UE's at a gNB's reception. In CA, multiple uplink cells share the same TA if they belong to the same TA group (TAG). Since this is not reflected in Rel-15 capability, it is possible to have different PUCCH groups belonging to the same TAG in Rel-15. Therefore, Rel-16 capability of such scenario is required.

The present application also discloses introduction of Rel-16 capability for 2 PUCCH groups in the same frequency band which is also possible in Rel-15. In cellular communication, cancellation of an uplink signal/channel can be dynamically indicated by a gNB. In this case, depending on arrival timing of such dynamic cancellation indication, an uplink signal/channel may not be fully cancelled as in Rel-15. However, partial cancellation would incur technically challenge to a UE. Thus, the present application discloses Rel-16 capability for partial cancellation.

These capabilities are similarly limiting compared to the aforementioned PUCCH grouping, and can follow the aforementioned general framework of a particular functionality.

In 3GPP document R1-2007022, other scenarios with simultaneous operation of multiple functionalities are discussed. In 3GPP Rel-15, support of an aperiodic sounding reference signal (AP-SRS) when the AP-SRS and its triggering downlink control information (DCI) are not in the same slot is mandatory for a UE to support. The UE first decodes the DCI, then determines the request for the AP-SRS, and subsequently transmits the AP-SRS.

Since the AP-SRS and DCI are not in the same slot, e.g., DCI can be in slot n, and the AP-SRS can be in slot n+1, a UE is provided a certain amount of time to prepare for AP-SRS transmission. However, if DCI is located at the end of slot n, then the amount of time a UE can have for AP-SRS preparation considerably decreases compared to when the DCI is located at the start of slot n.

FIGS. 4A, 4B, 4C, 4D, and 4E illustrate UE capabilities in the DL control channel and procedure feature of Rel-15, to which the disclosure is applied.

Specifically, FIG. 4A illustrates feature group 3-1 (410) of Rel-15, FIG. 4B illustrates feature group 3-2 (420) of Rel-15, FIG. 4C illustrates feature group 3-5 (430) of Rel-15, FIG. 4D illustrates feature group 3-5a (440) of Rel-15, and FIG. 4E illustrates feature group 3-5b (440) of Rel-15.

As stated above, the amount of time a UE can have for AP-SRS preparation considerably decreases compared to when the DCI is located at the start of slot n. This situation is possible if a UE declared support of physical downlink control channel (PDCCH) monitoring capability, which due to their descriptions could occur in any of feature groups 3-2 (420) in FIG. 4B, 3-5 (430) in FIG. 4C, 3-5a (440) in FIG. 4D, and 3-5b (450) in FIG. 4E other than feature group 3-1 (420) in Rel-15 as illustrated in FIG. 4A. Hence, a new capability signaling in Rel-16 was created to ensure a certain amount of offset between the AP-SRS and DCI, such that the UE can decline the Rel-15 version and support the Rel-16 version.

If a UE cannot support AP-SRS when DCI and an AP-SRS gap are small, such a UE would not be able to declare support of PDCCH monitoring capability other than feature group 3-1 (410) in Rel-15, illustrated in FIG. 4A. In this case, even if a UE declares a new capability signaling to ensure a certain amount of offset between AP-SRS and DCI, this may not be useful since the only applicability of this signaling is when a UE declares support of PDCCH monitoring capability other than feature group 3-1 (410) in FIG. 4A. This UE cannot declare support of PDCCH monitoring capability other than feature group 3-1 (410) in FIG. 4A even with new signaling since Rel-15 network may not be able to understand new capability in Rel-16. Specifically, new Rel-16 capability signaling is created for functionalities of feature groups 3-2 (420) in FIG. 4B, 3-5 (430) in FIG. 4C, 3-5a (440) in FIG. 4D, 3-5b (450) in FIG. 4E with the same or more flexible basis (per-UE, per BC, per-FS, per-FSPC etc.) than feature groups 3-2 (420), 3-5 (430), 3-5a (440), and 3-5b (450) of Rel-15.

In general, a particular functionality for which capability signaling exists in release-N and a functionality B for which support if mandatory in release-N can be considered. In later release N+m where m>0, capability signaling for limited simultaneous support of a particular functionality and B can be introduced.

When a UE declares support of a particular functionality in both releases N and N+m, the interpretation of capability in release-N needs to be modified such that the release-N capable gNB can correctly understand the UE's limitation. In this case, interpretation of capability in release-N can be most conservative of capability signaling in release N+m.

If a UE does not declare capability for a particular functionality in release-N, while it declares further limiting capability in release N+m, with a release-N capable gNB, a UE will not be configured with a particular functionality. In this case, capability signaling in release N+m should be self-complete to fully realize operation of capability in release-N as well. In other words, a new capability signaling corresponding to a particular functionality would need to be created in release N+m with the same or more flexible basis (per-UE, per BC, per-FS, per-FSPC etc.) than capability of release-N.

In some mechanisms, such support indication can be implicit. For example, indication of support of limited scenarios using release N+m capability can be interpreted as support of a particular functionality. In another mechanism, limited simultaneous support of functionalities A and B may not be allowed in release N+m. In this case, applicability is only for functionality B and some other functionality C which exists in release N+m.

Indication from a network can be provided to a UE such that the UE can understand the network's release version. In this case, a UE can signal support of a particular functionality using release-N signaling even if it only supports limited simultaneous support of functionalities A and B if it knows that network release version is N+m.

In 3GPP document R1-2007022, a similar scenario is discussed. In Rel-15, support of dynamic slot format indicator (SFI) is declared by capability signaling as reproduced below.

If a UE makes this declaration and SFI indicates the corresponding portion as downlink or flexible symbols as shown below in TS38.213, then the UE should cancel semi-static uplink transmission.

---

If a UE is configured by higher layers to transmit SRS, or PUCCH, or PUSCH, or PRACH in a set of symbols of a slot and the UE detects a DCI format 2_0 with a slot format value other than 255 that indicates a slot format with a subset of symbols from the set of symbols as downlink or flexible, or the UE detects a DCI format 1_0, DCI format 1_1, or DCI format 0_1 indicating to the UE to receive CSI-RS or PDSCH in a subset of symbols from the set of symbols, then > the UE does not expect to cancel the transmission in symbols from the set of symbols that occur, relative to a last symbol of a CORESET where the UE detects the DCI format 2_0 or the DCI format 1_0 or the DCI format 1_1 or the DCI format 0_1, after a number of symbols that is smaller than the PUSCH preparation time $T_{proc,2}$ for the corresponding PUSCH processing capability [6, TS 38.214] assuming $d_{2,1} = 1$ and μ corresponds to the smallest SCS configuration between the SCS configuration of the PDCCH carrying the DCI format 2_0, DCI format 1_0, DCI format 1_1 or DCI format 0_1 and the SCS configuration of the SRS, PUCCH, PUSCH or $\square_r$, where $\square_r$ corresponds to the SCS configuration of the PRACH if it is 15 kHz or higher; otherwise $\square_r = 0$ the UE cancels the PUCCH, or PUSCH, or PRACH transmission in remaining symbols from the set of symbols and cancels the SRS transmission in remaining symbols from the subset of symbols.

---

A potential issue is that a UE may need to apply partial cancellation, if the SFI does not arrive early enough, and such partial cancellation can be challenging. That is, it can be considered that a stoppage may not be prudent or resource considerate when the cancellation is requested during the transmission. To address this, a new Rel-16 capability signaling to support partial cancellation was introduced.

A new Rel-16 capability signaling to support partial cancellation may only be applicable to functionalities incurring cancellation introduced in Rel-16 or later such as uplink cancellation indication shown below, or a release indication from a network can be provided to a UE.

FIGS. 5A and 5B(A)-5B(B) illustrate feature groups in feature 5 of Rel-15, to which the disclosure is applied. Specifically, FIG. 5A illustrates feature group 5-1 (510) of Rel-15, and FIG. 5B(A)-5B(B) illustrate feature group 5-1a (520) of Rel-15.

In cancellation incurred by scheduling DCI, as described above, the UE detects a DCI format 1_0, DCI format 1_1, or DCI format 0_1 indicating to the UE to receive CSI-RS or PDSCH in a subset of symbols from the set of symbols, which is mandatory. As shown in FIG. 5B(A)-5B(B), such functionality is declared by feature group 5-1a (520) as a part of a UE specific radio resource control (RRC) uplink/downlink (UL/DL) assignment. Even with new capability signaling, a UE cannot benefit since feature group 5-1a (520) in FIG. 5B(A)-5B(B) may not be declared by a UE for a Rel-15 network. To solve this issue, FIGS. 6A(A)-6A(B) and 6B(A)-6B(B) are introduced.

FIGS. 6A(A)-6A(B) and 6B(A)-6B(B) illustrate Rel-16 capability for functionality of feature group 5-1a (520) in Rel-15, to which the disclosure is applied. Specifically, FIG. 6A(A)-6A(B) illustrate feature group 11-7 (610) in Rel-16, and FIG. 6B(A)-6B(B) illustrate feature group 11-7a (620) in Rel-16.

Referring to FIGS. 5A and 5B(A)-5B(B) and FIGS. 6A(A)-6A(B) and 6B(A)-6B(B), despite the introduction of feature groups 11-7 (610) and 11-7a (620), since feature group 5-1 (510) in FIG. 5A is mandatory, related functionality with component 7 in the description column of feature group 5-1 (510) in Rel-15 is an issue. In this case, a new Rel-16 capability signaling corresponding to component 7 in the description column is disclosed. In this case, UL partial cancellation behavior due to scheduling DCI in Rel-15 when a UE does not support UE-specific RRC UL/DL assignment can become unspecified.

The aforementioned mechanisms can create a discrepancy in UE behavior between two different networks with release-N and release N+m capability. In this case, the situation can be ambiguous since the UE does not know of which release a network is capable. Hence, to regulate proper UE behavior, an indication from a network regarding which portion of capability between release-N and release N+m the network acknowledged would need to be provided. Such an indication can be UE specific dedicated high layer signaling. For example, a network can indicate to a UE that the UE will not be configured with unsupported PUCCH grouping and TAG in above examples. Also, a network can indicate to a UE that the UE will not be asked for partial cancellation when uplink signal/channel cancellation occurs in one of the above examples.

FIG. 7 is a block diagram of an electronic device in a network environment, according to an embodiment. Referring to FIG. 7, an electronic device 701 in a network environment 700 may communicate with an electronic device 702 via a first network 798 (e.g., a short-range wireless communication network), or an electronic device 704 or a server 708 via a second network 799 (e.g., a long-range wireless communication network). The electronic device 701 may communicate with the electronic device 704 via the server 708. The electronic device 701 may include a processor 720, a memory 730, an input device 750, a sound output device 755, a display device 760, an audio module 770, a sensor module 776, an interface 777, a haptic module 779, a camera module 780, a power management module 788, a battery 789, a communication module 790, a subscriber identification module (SIM) 796, or an antenna module 797. In one embodiment, at least one (e.g., the display device 760 or the camera module 780) of the components may be omitted from the electronic device 701, or one or more other components may be added to the electronic device 701. Some of the components may be implemented as a single integrated circuit (IC). For example, the sensor module 776 (e.g., a fingerprint sensor, an iris sensor, or an illuminance sensor) may be embedded in the display device 760 (e.g., a display).

The processor 720 may execute, for example, software (e.g., a program 740) to control at least one other component (e.g., a hardware or a software component) of the electronic device 701 coupled with the processor 720 and may perform various data processing or computations. As at least part of the data processing or computations, the processor 720 may load a command or data received from another component (e.g., the sensor module 776 or the communication module 790) in volatile memory 732, process the command or the data stored in the volatile memory 732, and store resulting data in non-volatile memory 734. The processor 720 may include a main processor 721 (e.g., a central processing unit (CPU) or an application processor (AP)), and an auxiliary processor 723 (e.g., a graphics processing unit (GPU), an image signal processor (ISP), a sensor hub processor, or a communication processor (CP)) that is operable independently from, or in conjunction with, the main processor 721. Additionally or alternatively, the auxiliary processor 723 may be adapted to consume less power than the main processor 721, or execute a particular function. The auxiliary processor 723 may be implemented as being separate from, or a part of, the main processor 721.

The auxiliary processor 723 may control at least some of the functions or states related to at least one component (e.g., the display device 760, the sensor module 776, or the communication module 790) among the components of the electronic device 701, instead of the main processor 721 while the main processor 721 is in an inactive (e.g., sleep) state, or together with the main processor 721 while the main processor 721 is in an active state (e.g., executing an application). The auxiliary processor 723 (e.g., an image signal processor or a communication processor) may be implemented as part of another component (e.g., the camera module 780 or the communication module 790) functionally related to the auxiliary processor 723.

The memory 730 may store various data used by at least one component (e.g., the processor 720 or the sensor module 776) of the electronic device 701. The various data may include, for example, software (e.g., the program 740) and input data or output data for a command related thereto. The memory 730 may include the volatile memory 732 or the non-volatile memory 734.

The program 740 may be stored in the memory 730 as software, and may include, for example, an operating system (OS) 742, middleware 744, or an application 746.

The input device 750 may receive a command or data to be used by another component (e.g., the processor 720) of the electronic device 701, from the outside (e.g., a user) of the electronic device 701. The input device 750 may include, for example, a microphone, a mouse, or a keyboard.

The sound output device 755 may output sound signals to the outside of the electronic device 701. The sound output device 755 may include, for example, a speaker or a receiver. The speaker may be used for general purposes, such as playing multimedia or recording, and the receiver may be used for receiving an incoming call. The receiver may be implemented as being separate from, or a part of, the speaker.

The display device 760 may visually provide information to the outside (e.g., a user) of the electronic device 701. The display device 760 may include, for example, a display, a hologram device, or a projector and control circuitry to control a corresponding one of the display, hologram device, and projector. The display device 760 may include touch circuitry adapted to detect a touch, or sensor circuitry (e.g., a pressure sensor) adapted to measure the intensity of force incurred by the touch.

The audio module 770 may convert a sound into an electrical signal and vice versa. The audio module 770 may obtain the sound via the input device 750 or output the sound via the sound output device 755 or a headphone of an external electronic device 702 directly (e.g., wired) or wirelessly coupled with the electronic device 701.

The sensor module 776 may detect an operational state (e.g., power or temperature) of the electronic device 701 or an environmental state (e.g., a state of a user) external to the electronic device 701, and then generate an electrical signal or data value corresponding to the detected state. The sensor module 776 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 777 may support one or more specified protocols to be used for the electronic device 701 to be coupled with the external electronic device 702 directly (e.g., wired) or wirelessly. The interface 777 may include, for example, a high definition multimedia interface (HDMI), a universal serial bus (USB) interface, a secure digital (SD) card interface, or an audio interface.

A connecting terminal 778 may include a connector via which the electronic device 701 may be physically connected with the external electronic device 702. The connecting terminal 778 may include, for example, an HDMI connector, a USB connector, an SD card connector, or an audio connector (e.g., a headphone connector).

The haptic module 779 may convert an electrical signal into a mechanical stimulus (e.g., a vibration or a movement) or an electrical stimulus which may be recognized by a user via tactile sensation or kinesthetic sensation. The haptic module 779 may include, for example, a motor, a piezoelectric element, or an electrical stimulator.

The camera module 780 may capture a still image or moving images. The camera module 780 may include one or more lenses, image sensors, image signal processors, or flashes.

The power management module 788 may manage power supplied to the electronic device 701. The power management module 788 may be implemented as at least part of, for example, a power management integrated circuit (PMIC).

The battery 789 may supply power to at least one component of the electronic device 701. The battery 789 may include, for example, a primary cell which is not rechargeable, a secondary cell which is rechargeable, or a fuel cell.

The communication module 790 may support establishing a direct (e.g., wired) communication channel or a wireless communication channel between the electronic device 701 and the external electronic device (e.g., the electronic device 702, the electronic device 704, or the server 708) and performing communication via the established communication channel. The communication module 790 may include one or more communication processors that are operable independently from the processor 720 (e.g., the AP) and supports a direct (e.g., wired) communication or a wireless communication. The communication module 790 may include a wireless communication module 792 (e.g., a cellular communication module, a short-range wireless communication module, or a global navigation satellite system (GNSS) communication module) or a wired communication module 794 (e.g., a local area network (LAN) communication module or a power line communication (PLC) module). A corresponding one of these communication modules may communicate with the external electronic device via the first network 798 (e.g., a short-range communication network, such as Bluetooth™, wireless-fidelity (Wi-Fi) direct, or a standard of the Infrared Data Association (IrDA)) or the second network 799 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 792 may identify and authenticate the electronic device 701 in a communication network, such as the first network 798 or the second network 799, using subscriber information (e.g., international mobile subscriber identity (IMSI)) stored in the subscriber identification module 796.

The antenna module 797 may transmit or receive a signal or power to or from the outside (e.g., the external electronic device) of the electronic device 701. The antenna module 797 may include one or more antennas, and, therefrom, at least one antenna appropriate for a communication scheme used in the communication network, such as the first network 798 or the second network 799, may be selected, for example, by the communication module 790 (e.g., the wireless communication module 792). The signal or the power may then be transmitted or received between the communication module 790 and the external electronic device via the selected at least one antenna.

At least some of the above-described components may be mutually coupled and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

Commands or data may be transmitted or received between the electronic device 701 and the external electronic device 704 via the server 708 coupled with the second network 799. Each of the electronic devices 702 and 704 may be a device of a same type as, or a different type, from the electronic device 701. All or some of operations to be executed at the electronic device 701 may be executed at one or more of the external electronic devices 702, 704, or 708. For example, if the electronic device 701 should perform a function or a service automatically, or in response to a request from a user or another device, the electronic device 701, instead of, or in addition to, executing the function or the service, may request the one or more external electronic devices to perform at least part of the function or the service. The one or more external electronic devices receiving the request may perform the at least part of the function or the service requested, or an additional function or an additional service related to the request and transfer an outcome of the performing to the electronic device 701. The electronic device 701 may provide the outcome, with or without further processing of the outcome, as at least part of a reply to the request. To that end, a cloud computing, distributed computing, or client-server computing technology may be used, for example.

FIG. 8 is a flowchart illustrating a method of controlling capability signaling of a UE in consideration of a telecommunications standard release N and a telecommunications standard release N+m where m>0, according to an embodiment.

In step 801, it is determined that the UE is configured to report the capability signaling of the UE in the release N and the release N+m. In step 803, the UE is controlled so as to report the capability signaling of the UE according to the release N+m instead of the release N.

In the method of FIG. 8, a level of controllability of the UE in the release N+m is greater than or equal to the level of controllability of the UE in the release N. That is, as described above in reference to FIGS. 3A(A)-3A(B) and 3B(A)-3B(B), the level of controllability for the UE of the related signaling in a new release may be greater than or equal to the granularity in the earlier release.

The embodiments of the present disclosure can also be embodied as computer-readable codes on a computer-readable recording medium, which may be non-transitory. The computer-readable recording medium is any data storage device that can store data that can thereafter be read by a computer system. Examples of the computer-readable recording medium include, but are not limited to, read-only memory (ROM), random-access memory (RAM), CD-ROMs, magnetic tapes, floppy disks, optical data storage devices. The computer-readable recording medium can also be distributed over network-coupled computer systems so that the computer-readable code is stored and executed in a distributed fashion. Also, function programs, codes, and code segments for accomplishing the present disclosure can be easily construed as within the scope of the disclosure by programmers skilled in the art to which the present disclosure pertains.

While the present disclosure has been described with reference to various embodiments, various changes may be made without departing from the spirit and the scope of the disclosure, which is defined, not by the detailed description and embodiments, but by the appended claims and their equivalents.

What is claimed is:

1. A method of reporting capability signaling of a user equipment (UE), the method comprising:

determining that the capability signaling of the UE may be reported according to a first telecommunications second standard release and a telecommunications standard release; and determining that a level of granularity provided by the capability signaling in the second telecommunications standard release is greater than or equal to a level of granularity provided by the capability signaling in the first telecommunications standard release, and that the second telecommunications standard release is a later telecommunications standard release than the first telecommunications standard release; and in response to determining that the level of granularity provided by the capability signaling in the second telecommunications standard release is greater than or equal to the level of granularity provided by the capability signaling in the first telecommunications standard release, and that the second telecommunications standard release is a later telecommunications standard release than the first telecommunications standard release, reporting the capability signaling of the UE according to the second telecommunications standard release instead of the first telecommunications standard release.

2. The method of claim 1, wherein the capability signaling of the UE is reported to a base station by the UE.

3. The method of claim 2, wherein a functionality corresponding to the capability signaling of the UE in the first telecommunications standard release is indicated to the base station as the capability signaling in the second telecommunications standard release when the UE the in reports capability signaling the second telecommunications standard release, and wherein the capability signaling in the first telecommunications standard release is different from the capability signaling in the second telecommunications standard release.

4. The method of claim 3, wherein a level of controllability of the UE in the second telecommunications standard release is determined by a basis for the UE to report the capability signaling in the second telecommunications standard release, and wherein a level of controllability of the UE in the first telecommunications standard release is determined by the basis for the UE to report the capability signaling in the first telecommunications standard release.

5. The method of claim 4, wherein the basis for the UE to report the capability signaling in the first telecommunications standard release and the basis for the UE to report the capability signaling in the second telecommunications standard release includes at least one of per UE, per band, per band combination (BC), per feature set (FS), and per feature set per component carrier (FSPC).

6. The method of claim 1, wherein the capability signaling of the UE according to the second telecommunications standard release supports partial cancellation of an uplink signal.

7. The method of claim 1, wherein determining that the capability signaling of the UE may be reported according to the first telecommunications standard release and the second telecommunications standard release further comprises providing a portion of the first telecommunications standard release or a portion of the second telecommunications standard release to report the capability signaling.

8. The method of claim 7, further comprising:

receiving an indication, from a base station via higher layer signaling, of whether to provide the portion of the first telecommunications standard release or the portion of the second telecommunications standard release.

9. The method of claim 1, wherein the second telecommunications standard release supports two or more uplink channel groups belonging to the same timing advance group (TAG).

10. A user equipment (UE), comprising:

a memory; and a processor, wherein the processor is configured to control the UE to report the UE's capability signaling by:

determining that the capability signaling of the UE may be reported according to a first telecommunications standard release and a second telecommunications standard release;

determining that a level of granularity provided by the capability signaling in the second telecommunications standard release is greater than or equal to a level of granularity provided by the capability signaling in the first telecommunications standard release, and that the second telecommunications standard release is a later telecommunications standard release than the first telecommunications standard release; and in response to determining that the level of granularity provided by the capability signaling in the second telecommunications standard release is greater than or equal to the level of granularity provided by the capability signaling in the first telecommunications standard release, and that the second telecommunications standard release is a later telecommunications standard release than the first telecommunications standard release, reporting the capability signaling of the UE according to the second telecommunications standard release instead of the first telecommunications standard release.

11. The UE of claim 10, wherein the capability signaling of the UE is reported to a base station by the UE.

12. The UE of claim 11, wherein a functionality corresponding to the capability signaling of the UE in the first telecommunications standard release is indicated to the base station as the capability signaling in the second telecommunications standard release when the UE reports the capability signaling in the second telecommunications standard release, and wherein the capability signaling in the first telecommunications standard release is different from the capability signaling in the second telecommunications standard release.

13. The UE of claim 12, wherein a level of controllability of the UE in the second telecommunications standard release is determined by a basis for the UE to report the capability signaling in the second telecommunications standard release, and wherein a level of controllability of the UE in the first telecommunications standard release is determined by the basis for the UE to report the capability signaling in the first telecommunications standard release.

14. The UE of claim 13, wherein the basis for the UE to report the capability signaling in the first telecommunications standard release and the basis for the UE to report the capability signaling in the second telecommunications standard release includes at least one of per UE, per band, per band combination (BC), per feature set (FS), and per feature set per component carrier (FSPC).

15. The UE of claim 10, wherein the capability signaling of the UE according to the second telecommunications standard release supports partial cancellation of an uplink signal.

16. The UE of claim 10, wherein determining that the capability signaling of the UE may be reported according to the first telecommunications standard release and the second telecommunications standard release further comprises providing a portion of the first telecommunications standard release or a portion of the second telecommunications standard release to report the capability signaling.

17. The UE of claim 16, wherein the processor is further configured to control the UE by:

controlling the UE to receive an indication, from a base station via higher layer signaling, of whether to provide the portion of the first telecommunications standard release or the portion of the second telecommunications standard release.

18. The UE of claim 10, wherein the second telecommunications standard release supports two or more uplink channel groups belonging to the same timing advance group (TAG).

* * * * *